US012470881B2

(12) United States Patent
Stewart et al.

(10) Patent No.: US 12,470,881 B2
(45) **Date of Patent: *Nov. 11, 2025**

(54) HEARING ASSISTANCE DEVICE

(71) Applicant: STARKEY LABORATORIES, INC., Eden Prairie, MN (US)

(72) Inventors: Jay M. Stewart, Eden Prairie, MN (US); Westley G. Gentry, Buffalo, MN (US); Michael K. Sacha, Chanhassen, MN (US); Craig C. Feldsien, Prior Lake, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,634

(22) Filed: Apr. 21, 2022

(65) Prior Publication Data

US 2022/0248154 A1 Aug. 4, 2022

Related U.S. Application Data

(63) Continuation of application No. 15/429,898, filed on Feb. 10, 2017, now Pat. No. 11,350,227.

(51) Int. Cl.

*H04R 25/02* (2006.01)
*H04R 25/00* (2006.01)

(52) U.S. Cl.

CPC ......... *H04R 25/609* (2019.05); *H04R 25/604* (2013.01); *H04R 25/652* (2013.01);
(Continued)

(58) Field of Classification Search

CPC ................ H04R 25/658; H04R 25/652; H04R 2225/023; H04R 2225/025; H04R 2225/77; H04R 25/48; H04R 25/558; H04R 25/604; H04R 25/609; H04R 25/65; H04R 25/656; H04R 25/02; H04R 25/30; H04R 25/456;
(Continued)

(56) References Cited

U.S. PATENT DOCUMENTS

| | | | | |
|---|---|---|---|---|
| 4,617,429 A * | 10/1986 | Bellafiore | ............ | H04R 25/658<br>264/222 |
| 4,735,759 A * | 4/1988 | Bellafiore | ............ | H04R 25/652<br>264/293 |

(Continued)

FOREIGN PATENT DOCUMENTS

| | | |
|---|---|---|
| EP | 1314337 | 5/2003 |
| WO | 2010/147554 | 12/2010 |

OTHER PUBLICATIONS

European Search Report for EP Patent Application No. 18153487.6 dated Jun. 25, 2018, 7 pages.

*Primary Examiner* — Gerald Gauthier
(74) *Attorney, Agent, or Firm* — Mueting Raasch Group

(57) ABSTRACT

Various embodiments of a hearing assistance device and a method of forming such device are disclosed. The device includes a housing having a shell and a frame disposed at least partially within the shell. An inner surface of the shell and at least a portion of the frame define a void. Further, an indentation hardness value of the frame is greater than an indentation hardness value of the shell. The hearing assistance device also includes hearing assistance components that are disposed at least partially within the void.

20 Claims, 5 Drawing Sheets

(52) U.S. Cl.
CPC ......... *H04R 25/656* (2013.01); *H04R 25/658* (2013.01); *H04R 2225/023* (2013.01); *H04R 2225/025* (2013.01); *H04R 2225/77* (2013.01)

(58) Field of Classification Search
CPC ...... H04R 25/55; H04R 25/60; H04R 25/602; A61F 11/30; B33Y 80/00; C07H 19/16
See application file for complete search history.

(56) References Cited

U.S. PATENT DOCUMENTS

| | | | | | |
|---|---|---|---|---|---|
| RE33,017 | E * | 8/1989 | Bellafiore | H04R 25/652 381/328 |
| 4,870,688 | A | 9/1989 | Voroba et al. | |
| 5,790,672 | A * | 8/1998 | Klostermeier | H04R 25/609 381/328 |
| 6,022,311 | A | 2/2000 | Juneau et al. | |
| 6,228,020 | B1 | 5/2001 | Juneau et al. | |
| 6,254,526 | B1 | 7/2001 | Juneau et al. | |
| 6,354,990 | B1 | 3/2002 | Juneau et al. | |
| 6,432,247 | B1 | 8/2002 | Juneau et al. | |
| 6,434,248 | B1 | 8/2002 | Juneau et al. | |
| 6,438,244 | B1 | 8/2002 | Juneau et al. | |
| 6,473,512 | B1 | 10/2002 | Juneau et al. | |
| 6,695,943 | B2 | 2/2004 | Juneau et al. | |
| 6,728,383 | B1 | 4/2004 | Juneau et al. | |
| 7,130,437 | B2 * | 10/2006 | Stonikas | H04R 25/658 381/328 |
| 7,217,335 | B2 | 5/2007 | Juneau et al. | |
| 7,875,223 | B2 | 1/2011 | Masters | |
| 7,933,425 | B2 * | 4/2011 | Niederdrank | H04R 25/558 381/328 |
| 8,175,309 | B2 * | 5/2012 | Hanisch | H04R 25/65 381/322 |
| 8,885,858 | B2 * | 11/2014 | Nielsen | H04R 25/558 381/328 |
| 9,027,698 | B2 * | 5/2015 | Lederman | A61F 11/30 181/129 |
| 11,350,227 | B2 * | 5/2022 | Stewart | H04R 25/656 |
| 2002/0027669 | A1 | 3/2002 | Nagatomi et al. | |
| 2002/0032362 | A1 * | 3/2002 | Juneau | C07H 19/16 600/25 |
| 2004/0252854 | A1 * | 12/2004 | Juneau | C07H 19/16 381/322 |
| 2005/0117765 | A1 * | 6/2005 | Meyer | B33Y 80/00 381/328 |
| 2005/0141739 | A1 * | 6/2005 | Juneau | H04R 25/652 381/328 |
| 2006/0115105 | A1 * | 6/2006 | Brumback | H04R 25/658 381/328 |
| 2007/0009129 | A1 * | 1/2007 | Meyer | H04R 25/658 381/328 |
| 2008/0063231 | A1 * | 3/2008 | Juneau | H04R 25/652 381/328 |
| 2009/0245558 | A1 * | 10/2009 | Spaulding | H04R 25/656 381/328 |
| 2011/0103630 | A1 * | 5/2011 | Azernikov | H04R 25/658 381/328 |
| 2011/0182451 | A1 | 7/2011 | Vaarbroe et al. | |
| 2011/0281965 | A1 * | 11/2011 | Laas | C08G 18/792 521/137 |
| 2012/0186901 | A1 * | 7/2012 | Lederman | A61F 11/30 181/129 |
| 2012/0219168 | A1 * | 8/2012 | Zhao | H04R 25/60 381/328 |
| 2014/0044294 | A1 * | 2/2014 | Burns | H04R 25/604 381/328 |
| 2014/0153761 | A1 * | 6/2014 | Shennib | H04R 25/652 381/328 |
| 2014/0169604 | A1 * | 6/2014 | Christensen | H04R 25/602 381/328 |
| 2014/0185851 | A1 * | 7/2014 | Van Halteren | H04R 25/02 381/328 |
| 2014/0270298 | A1 * | 9/2014 | Johnson | H04R 25/65 381/328 |
| 2014/0355803 | A1 * | 12/2014 | Higgins | H04R 25/55 381/328 |
| 2014/0376756 | A1 * | 12/2014 | Petersen | H04R 25/65 381/328 |
| 2015/0092971 | A1 * | 4/2015 | Kim | H04R 25/30 381/328 |
| 2015/0271609 | A1 * | 9/2015 | Puria | H04R 25/456 381/328 |
| 2015/0289069 | A1 * | 10/2015 | Poulsen | H04R 25/656 381/328 |
| 2016/0057552 | A1 * | 2/2016 | Kure | H04R 25/65 381/328 |
| 2016/0080872 | A1 * | 3/2016 | Shennib | H04R 25/48 381/328 |
| 2017/0099553 | A1 | 4/2017 | Sacha et al. | |
| 2018/0234781 | A1 * | 8/2018 | Stewart | H04R 25/652 |
| 2022/0248154 | A1 * | 8/2022 | Stewart | H04R 25/652 |

* cited by examiner

HEARING ASSISTANCE DEVICE

RELATED PATENT APPLICATIONS

This application is a continuation of U.S. application Ser. No. 15/429,898 filed Feb. 10, 2017, which is incorporated herein by reference in its entirety.

BACKGROUND

Hearing assistance devices, such as hearing aids, can be used to assist patients suffering hearing loss by transmitting amplified sounds to one or both ear canals. Such devices typically include hearing assistance components such as a microphone for receiving ambient sound, an amplifier for amplifying the microphone signal in a manner that depends upon the frequency and amplitude of the microphone signal, a speaker or receiver for converting the amplified microphone signal to sound for the wearer, and a battery for powering the components.

In certain types of hearing aids, the hearing assistance components are enclosed by a housing that is designed to be worn in the ear for both aesthetic and functional reasons. Such devices may be referred to as in-the-ear (ITE), in-the-canal (ITC), completely-in-the-canal (CIC) type, or invisible-in-the-canal (IIC) hearing assistance devices. Other types of devices, referred to as receiver-in-canal (RIC) devices, include a receiver housing that is worn in the ear.

A typical housing for a hearing assistance device includes a hard shell that encases the hearing assistance components. Such devices are, however, difficult to repair as the components cannot be removed without taking the shell apart. If the shell is a molded piece of material that encases the electronics, then the components cannot be removed without damage to the shell.

SUMMARY

In general, the present disclosure provides various embodiments of a hearing assistance device and a method of forming such device. The hearing assistance device can include a housing and one or more hearing assistance components. The housing can include a shell and a frame disposed at least partially within the shell. The housing can further include a void defined by an inner surface of the shell and at least a portion of the frame. The hearing assistance components can be disposed at least partially within the shell. The frame can provide integrity to the shell while allowing one or more portions of the shell to collapse to better conform to an ear canal of a wearer.

In one aspect, the present disclosure provides a hearing assistance device that includes a housing having a shell and a frame disposed at least partially within the shell. An inner surface of the shell and at least a portion of the frame define a void. Further, an indentation hardness value of the frame is greater than an indentation hardness value of the shell. The hearing assistance device also includes hearing assistance components that are disposed at least partially within the void.

In another aspect, the present disclosure provides a method of forming a hearing assistance device that includes a housing and hearing assistance components disposed at least partially within the housing. The method includes forming a housing. Forming the housing includes forming a shell and forming a frame. The method further includes disposing at least one hearing assistance component of the hearing assistance components on the frame, and inserting the frame into the shell such that a void is defined between an inner surface of the shell and at least a portion of the frame.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
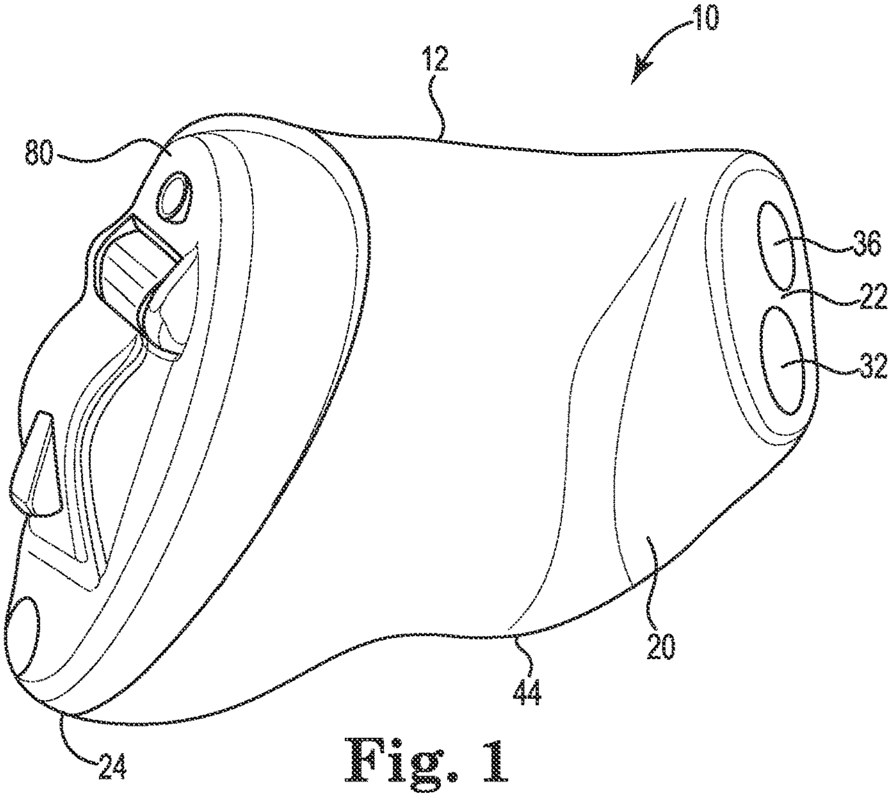
FIG. 1 is a schematic perspective view of one embodiment of a hearing assistance device.

In general, the present disclosure provides various embodiments of a hearing assistance device and a method of forming such device. The hearing assistance device can include a housing and one or more hearing assistance components. The housing can include a shell and a frame disposed at least partially within the shell. The housing can further include a void defined by an inner surface of the shell and at least a portion of the frame. The hearing assistance components can be disposed at least partially within the shell. The frame can provide integrity to the shell while allowing one or more portions of the shell to collapse to better conform to an ear canal of a wearer.

The present subject matter can be used for a variety of hearing assistance devices, including but not limited to, hearing aids such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user. Such devices are also known as receiver-in-the-canal (RIC) or receiver-in-the-ear (RITE) hearing assistance devices. It is understood that other hearing assistance devices not expressly stated herein may fall within the scope of the present subject matter.

A hearing assistance device typically includes at least one enclosure or housing, a microphone, hearing assistance device electronics including processing electronics, and a speaker or receiver. Hearing assistance devices may include a power source, such as a battery. In one or more embodiments, the battery may be rechargeable. In one or more embodiments, multiple energy sources may be employed. It is understood that in various embodiments the microphone is optional. It is further understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

A housing of a hearing assistance device that is worn in an ear and canal of a wearer may be custom made to increase wearer comfort when the device is worn for extended periods of time. Previous manufacturing techniques, however, have sometimes produced hearing assistance devices that are uncomfortable, resulting in high return rates of the devices. Such high return rates are generally associated with shell discomfort due to pressure points, skin irritation, or skin abrasion.

Manufacturers have tried unsuccessfully to use soft materials in a tip region of the housing that is first inserted into a wearer's ear as a way to increase comfort. Such soft materials can, however, become brittle or detached from the housing.

The present disclosure provides various embodiments of a hearing assistance device that includes a housing having a shell and a frame disposed at least partially within the shell. In one or more embodiments, the shell can include a material or materials that exhibit an indentation hardness that is less than an indentation hardness of the frame. Such a shell can provide additional comfort to the wearer as the shell may better conform to the shape of the ear canal, thereby placing less pressure on the ear canal. Further, the frame can provide structural rigidity to the housing while protecting one or more hearing assistance components that are disposed at least partially within the shell. Further, in one or more embodiments, one or more portions of the shell can be formed such that they can compress or collapse toward a void defined by an inner surface of the shell and at least a portion of the frame to provide a more conformal housing.

FIGS. 1-6 are various views of one embodiment of a hearing assistance device 10. The device 10 includes a housing 12 having a shell 20 and a frame 50 disposed at least partially within the shell. An inner surface 26 of the shell 20 and at least a portion 56 of the frame 50 define a void 42. The hearing assistance device 10 also includes hearing assistance components 60 disposed at least partially within the void 42. In one or more embodiments, the housing 12 can also include a faceplate 80 that can be connected to at least one of the shell 20 and the frame 50 as is further described herein.

Figure 2:
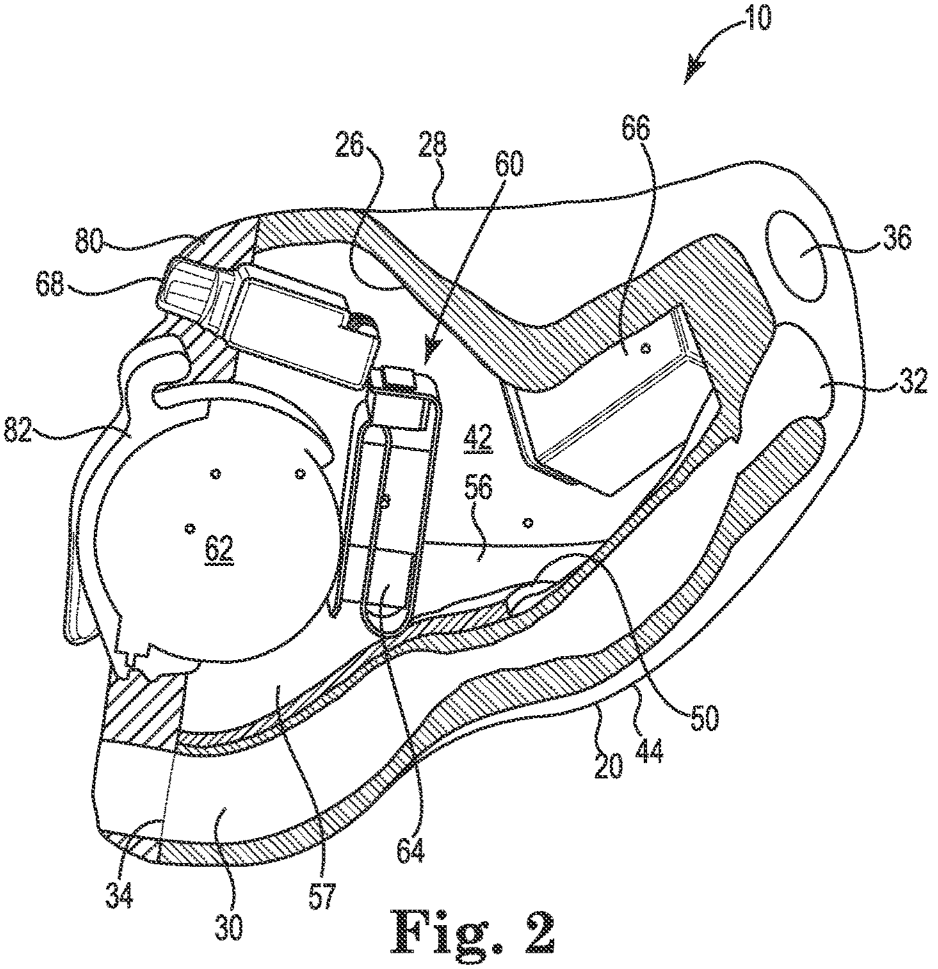
FIG. 2 is a schematic cross-section view of the hearing assistance device of FIG. 1.
Figure 3:
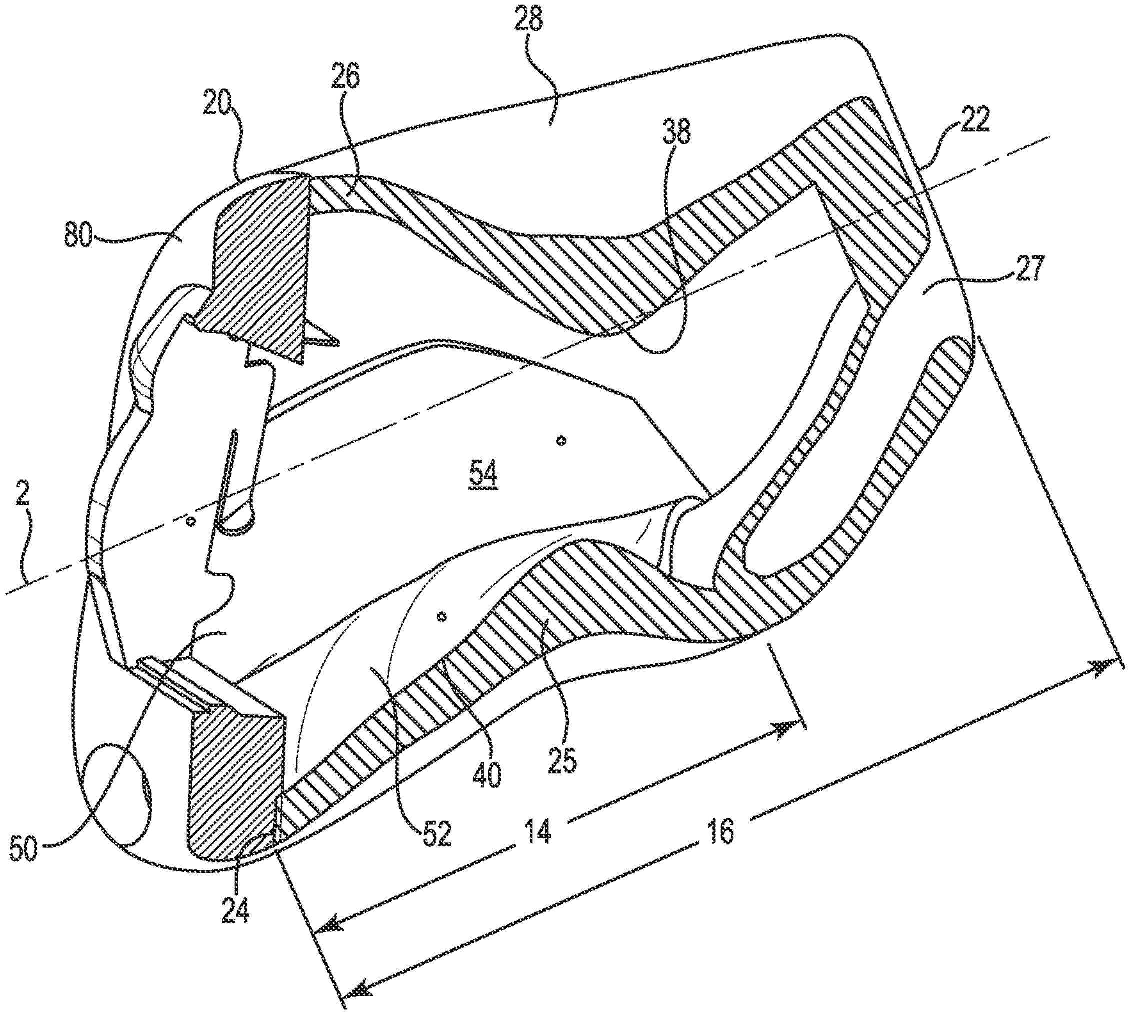
FIG. 3 is a schematic cross-section view of the hearing assistance device of FIG. 1 with hearing assistance components removed for clarity.
Figure 4:
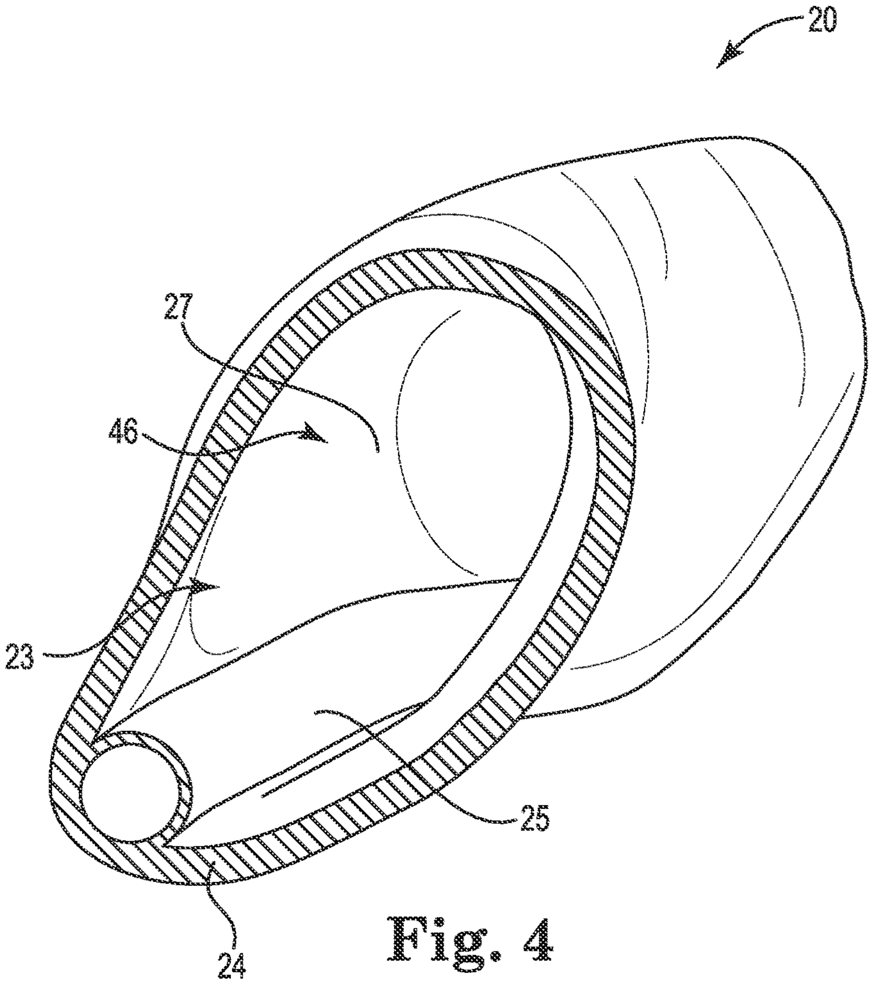
FIG. 4 is a schematic perspective view of a shell of the hearing assistance device of FIG. 1.
Figure 5:
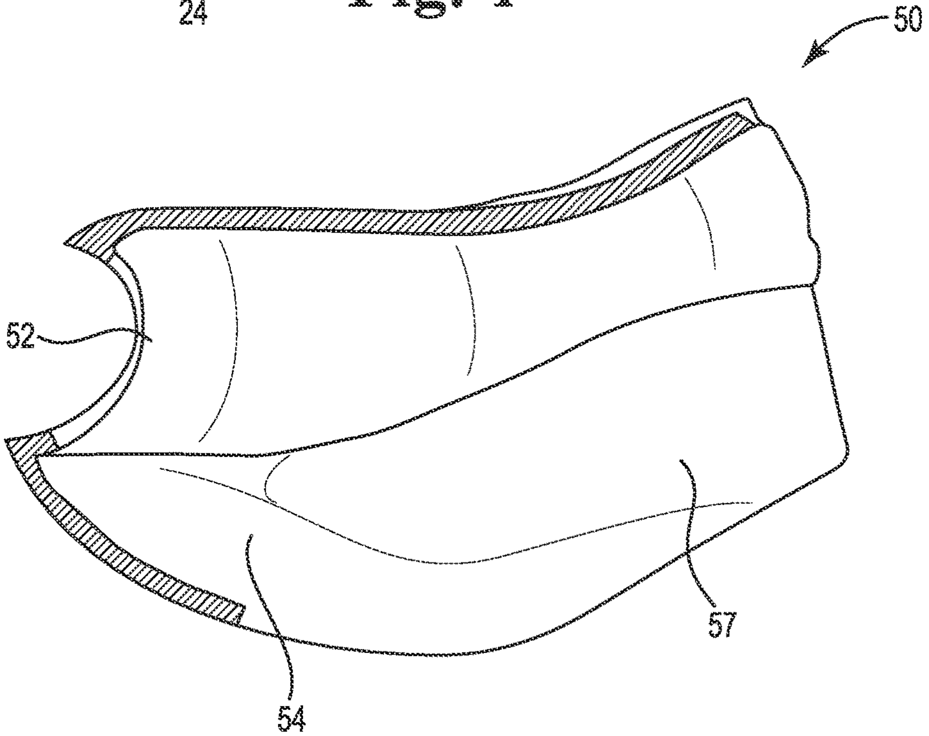
FIG. 5 is a schematic perspective view of a frame of the hearing assistance device of FIG. 1.

The shell 20 extends between a first end 22 and a second end 24 along a longitudinal axis 2 (FIG. 3). The shell 20 can include a vent 30 (FIG. 2) that includes an outlet 32 disposed in the first end 22 and an inlet 34 disposed in the second end 24. In one or more embodiments, the vent 30 can be integral with the shell 20, i.e., the vent and shell are formed together as one piece. The shell 20 can also include a sound hole 36 disposed in the first end 22 that is connected to a receiver 66 as is further described herein. In one or more embodiments, the shell 20 also includes an opening 23 (FIG. 4) disposed in the second end 24 through which the frame 50 and hearing assistance components 60 can be at least partially inserted into the shell. Further, the faceplate 80 can be at least partially inserted into the opening 23 when the faceplate is connected to the second end 24 of the shell 20.

The shell 20 of the hearing assistance device 10 can take any suitable shape or combination of shapes and have any suitable dimensions. In one or more embodiments, an outer surface 28 of the shell 20 can take a shape that substantially conforms to one or more portions of the ear canal of the wearer. For example, the outer surface 28 of the shell 20 can include a bend 44 that conforms to a bend of the ear canal. The shell 20 can have any suitable cross-sectional area as measured in a plane that is transverse to the longitudinal axis 2. In one or more embodiments, the shell 20 can have a cross-sectional area that is uniform along the longitudinal axis 2. In one or more embodiments, the shell 20 can have a cross-sectional area that varies along the longitudinal axis 2. For example, as shown in FIGS. 1-4, the shell 20 has a tapered shape such that the cross-sectional area decreases in a direction along the longitudinal axis 2 from the second end 24 to the first end 22. The shell 20 can enclose a volume 46 (FIG. 4) that can be any suitable dimensions and shape.

The shell 20 can have any suitable thickness. In one or more embodiments, the shell 20 has a uniform thickness between the inner surface 26 and the outer surface 28. In one or more embodiments, the shell 20 has a thickness that varies in one or more portions. For example, in one or more embodiments, the shell 20 can include one or more thin portions that are more easily collapsible towards the void 42 as is further described herein. In one or more embodiments, the shell 20 can have an average thickness of at least about 0.1 mm and no greater than about 10 mm.

Further, the shell 20 can be made, at least in part, of any suitable material or materials, e.g., polymeric, metallic, or inorganic materials, and combinations thereof. In one or more embodiments, the shell 20 can be made, at least in part, of one or more of silicone, condensation cure silicone, platinum cure silicone, peroxide cure silicone, synthetic rubber, thermoplastic elastomer, thermoplastic urethane, polyester and polyurethane foams, polyethylene foams, etc. In one or more embodiments, the material or materials utilized to form the shell 20 can be biocompatible. Further, in one or more embodiments, a biocompatible coating can be disposed on the outer surface 28 of the shell. Any suitable biocompatible coating can be utilized.

The shell 20 can include a material or materials such that the shell has any suitable overall indentation hardness value. In one or more embodiments, the shell 20 can have an indentation value of at least about 20 Shore A as measured in accordance with ASTM D2240-15. In one or more embodiments, the shell 20 can have an indentation hardness value of no greater than about 70 Shore A. In one or more embodiments, the shell 20 can include a first portion that has a first indentation hardness value and a second portion that has a second indentation hardness value that is different from the first indentation hardness value. In one or more embodiments, the shell 20 has a uniform indentation hardness value.

In one embodiment, the shell 20 can be a single piece of material. In one or more embodiments, the shell 20 can include two or more pieces that are connected together using any suitable technique or techniques.

Disposed at least partially within the shell 20 is the frame 50. As used herein, the phrase "at least partially within the shell" means at least a portion or portions of an element or component are disposed within the volume 46 enclosed by the shell 20. In one or more embodiments, the entire frame 50 is disposed within the shell 20.

The frame 50 can take any suitable shape or shapes and have any suitable dimensions. In one or more embodiments, the frame 50 can take a shape such that it conforms to at least a portion of the inner surface 26 of the shell 20. For example, as shown in FIGS. 2-5, a first portion 52 of the frame 50 conforms to a first portion 25 of the inner surface 26 of the shell 20. Further, a second portion 54 of the frame 50 conforms to a second portion 27 of the inner surface 26 of the shell 20.

In one or more embodiments, the inner surface 26 of the shell 20 and at least a portion of the frame 50 define the void 42 within the shell. In one or more embodiments, the void 42 is the volume 46 enclosed by the shell between the inner surface 26 and a first surface 57 of the frame 50. The void 42 can take any suitable shape or shapes and have any suitable dimensions. Further, the void 42 (and hence the volume 46) can be filled with any suitable gas, e.g., air, and have any suitable pressure, e.g., atmospheric pressure.

The frame 50 can be in contact with any suitable portion or portions of the inner surface 26 of the shell 20 to provide support for the shell. In one or more embodiments, the frame 50 is in contact with the entire inner surface 26 of the shell 30. In one or more embodiments, a first region 38 (FIG. 3) of the inner surface 26 of the shell 20 is spaced apart from the frame 50 and a second region 40 of the inner surface of the shell is in contact with the frame.

In one or more embodiments, the first region 38 of the inner surface 26 of the shell 20 that is spaced apart from the frame 50 is adapted to collapse into the void 42 when the hearing assistance device 10 is inserted into the ear canal of the wearer. Such collapsible region or regions can provide additional comfort to the wearer as these portions can more easily conform to the ear canal. The housing 10 can include any suitable number of collapsible regions of the shell 20.

As mentioned herein, the frame 50 can have any suitable dimensions. For example, as shown in FIG. 3, the frame 50 has a length 14 as measured along the longitudinal axis 2 of the shell 20 that extends between the first end 22 and the second end 24. The shell 20 has a length 16 as measured along the longitudinal axis 2. In one or more embodiments, the length 14 of the frame 50 is less than the length 16 of the shell 20. In one or more embodiments, the length 14 of the frame 50 can be equal to the length 16 of the shell 20.

Further, the frame 50 can include any suitable material or materials, e.g., polymeric, metallic, or inorganic materials, and combinations thereof. In one or more embodiments, the frame 50 can include at least one of photopolymers, fused deposition modelling (FDM) materials, cast urethanes, cast epoxies, nylons, polyethylene, acrylonitrile butadiene styrene (ABS), and ceramics. In one or more embodiments, the frame 50 can include one or more metals such as stainless steel, titanium, nickel, aluminum, silver and silver based alloys, and graphene. In one or more embodiments, the frame 50 can include wood or any other suitable inorganic material. In one or more embodiments, the frame 50 can be formed from one or more combinations of materials such as a silver ink surrounded by an ABS material. In one or more embodiments, the frame 50 can be formed from a polyimide or copper flex circuit material, where the frame is stamped or etched from the flex circuit material. In such embodiments, the frame can provide an electrical connection or connections for one or more hearing assistance components disposed on the frame.

The frame 50 can be a single piece or two or more pieces connected together using any suitable technique or techniques. In one or more embodiments, the frame 50 can be a solid piece of material. In one or more embodiments, the frame 50 can include one or more openings, e.g., the frame can include a mesh or skeletal structure.

The frame 50 can have any suitable indentation hardness value or values. In one or more embodiments, the frame 50 can have an indentation hardness value of at least about 50 Shore D as measured in accordance with ASTM D2240-15. Further, in one or more embodiments, the frame 50 can have an indentation hardness value of no greater than about 60 Rockwell C as measured in accordance with ASTM E18-16.

The shell 20 and the frame 50 can be manufactured using any suitable technique or techniques, e.g., injection molding, insert molding, 3D printing, etc. Suitable 3D printing techniques include, but are not limited to, stereolithography (SLA), digital light processing (DLP), fused deposition modeling (FDM), selective laser sintering (SLS), selective laser melting (SLM), electronic beam melting (EBM), and laminated object manufacturing (LOM).

In one or more embodiments, a customized shell 20 can be created from a digital scan of an impression of an ear cavity of the wearer using a point cloud brought into the earmold CAD modeling software. As used herein, the term "ear cavity" means at least a portion of one or both of an ear canal and pinna of the ear of the patient. In one or more embodiments, a standard shell modeling sequence can be utilized that is based on the impression shape and selected style. In one or more embodiments, the ear cavity of the patient can be digitally scanned to provide a model of the ear cavity. A specific digital shell 20 and frame 50 can be added during the standard modeling process. In one or more embodiments, a completed CAD modeling file can be saved in "stl" file format and provided to a 3D printer. Different 3D printing platforms can be utilized depending upon the material or materials utilized for the shell 20 and the frame 50. For example, hard materials can be printed layer by layer using SLA or DLP. In one or more embodiments, one or both of the shell 20 and frame 50 can be 3D printed using FDM, DLM, SLS, LDS, polyjet, multijet, or ultrasonic jet techniques, or combinations thereof. In one or more embodiments, the frame 50 can be formed and then encapsulated, coated, infiltrated, or constructed in layers to create multipurpose frames. In one or more embodiments, the frame 50 can be formed by laser cutting, etching, stamping, etc. For example, the frame 50 can be printed using SLA and coated manually with biocompatible sealant.

In one or more embodiments, soft silicone can be 3D printed using a thin walled cast methodology, creating a hollow cast with all digital component features for the shell 20. A secondary manual silicone injection process can create the final physical shell 20. In one or more embodiments, post-processing can include resin removal and curing. Soft thin walled casts filled with silicone can be cured under pressure. After fully curing, the outer casts are cracked and "de-shelled" to uncover the shell 20. All cast material can then be removed from the shell 20.

Manual and 3D printed cast techniques of defining and casting the internal contours of the interior surface 26 of the shell 20 can be utilized. The frame 50 can then be encapsulated, coated, infiltrated, or constructed in layers, to create multipurpose frames. Depending on the material or materials selected, the frame 50 can be formed by laser cutting, etching, stamping, etc. For example, the frame 50 can be printed and coated with a biocompatible coating. In one or more embodiments, the frame 50 can be a malleable flex circuit that can conform to one or more portions of the inner surface 26 of the shell 20 and include traces and leads for one or more of the hearing assistance components 60 that can be disposed on the frame.

The frame 50 can be disposed at least partially within the shell 20 using any suitable technique or techniques. In one or more embodiments, the frame 50 is friction fit within the shell 20. Further, in one or more embodiments, the frame 50 can be attached to the inner surface 26 of the shell 50 using any suitable technique or techniques, e.g., adhering, welding, molding, etc. Although not shown, in one or more embodiments, the inner surface 26 of the shell 20 can include a slot formed therein that is adapted to receive the frame 50 such that the frame can be inserted into the slot and retained at least partially within the shell. Further, in one or more embodiments, the frame 50 can be connected to the faceplate 80 such that the frame is inserted at least partially within the shell 20 when the faceplate is connected to the second end 24 of the shell. Any suitable technique or techniques can be utilized to connect the frame 50 to the faceplate 80. In one or more embodiments, the frame 50 and the faceplate 80 can be manufactured such that they are integral. In one or more embodiments, the frame 50 and the faceplate 80 can be manufactured separately and then connected using and suitable technique, e.g., adhering with an adhesive.

Disposed at least partially within the void 42 defined by the frame 50 and the shell 20 are the hearing assistance components 60. As used herein, the phrase "at least partially within the void" means at least a portion or portions of an element or component of the hearing assistance devices 60 are disposed within the void 42 defined by the shell 20 and the at least a portion 56 of the frame 50. In one or more embodiments, all of the hearing assistance components 60 are disposed within the void 42. The hearing assistance components 60 can include any suitable circuits or devices. As shown in FIG. 2, the hearing assistance components 60 include a battery 62 disposed in a battery door 82, a circuit module 64, a receiver 66, and a microphone 68.

The microphone 68 receives sound waves from the environment and converts the sound into an input signal. After amplification by a pre-amplifier of the module 64, the input signal can be sampled and digitized by an A/D converter of the module to provide a digitized input signal. Processing circuitry disposed in the module 64 processes the digitized input signal into an output signal in a manner that compensates for the patient's hearing deficit. The output signal is then passed to an audio amplifier of the module 64 that drives the receiver 66 for converting the output signal into an audio output. The battery 62 supplies power for these components.

In general, digital hearing assistance devices include a processor. In such devices, programmable gains may be employed to adjust the hearing aid output to a wearer's particular hearing impairment. The processor may be a digital signal processor (DSP), microprocessor, microcontroller, other digital logic, or combinations thereof. The processing may be performed by a single processor, or may be distributed over different devices. The processing of signals referenced in this application can be performed using the processor or other different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments, the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

One or more the hearing assistance components 60 can be disposed on the frame 50. For example, a first component of the hearing assistance components 60, e.g., the module 64, can be disposed on the frame 50 using any suitable technique or techniques. Any suitable number of circuits or devices of the hearing assistance components 60 can be disposed on the frame 50. By disposing one or more of the hearing assistance components 60 on the frame 50, the components can be at least partially disposed in the void 42 by inserting the frame into the void.

In one or more embodiments, one or more circuits or devices of the hearing assistance components 60 can be disposed on the inner surface 26 of the shell 20. For example, as shown in FIG. 2, a second component of the hearing assistance components 60, e.g., receiver 66, is disposed on the inner surface 26 of the shell 20. Any suitable technique or techniques can be utilized to dispose the second component on the inner surface 26 of the shell 20.

Figure 6:
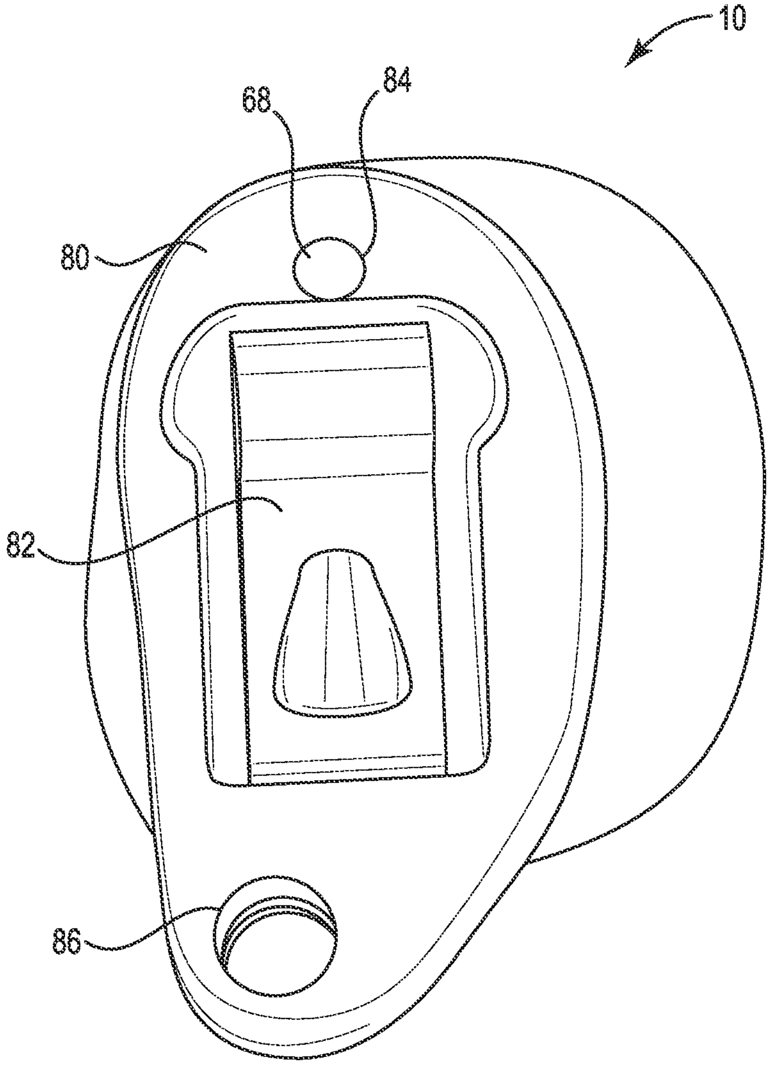
FIG. 6 is a schematic side view of the hearing assistance device of FIG. 1.

Connected to the second end 24 of the shell 20 is the faceplate 80. The faceplate 80 can include any suitable faceplate. In one or more embodiments, the faceplate 80 includes a status indicator light (not shown) and a microphone inlet port 84 (FIG. 6). The faceplate 80 can also include a vent port 86 that is in communication with the inlet 34 of the vent 30. Further, in one or more embodiments, the faceplate 80 can include the battery door 82 that can be hingedly attached to the faceplate to allow replacement of the battery 62. The faceplate 80 can include any suitable material or materials. In one or more embodiments, the faceplate 80 can include the same material or materials utilized to form at least one of the shell 20 and the frame 50.

Figure 7:
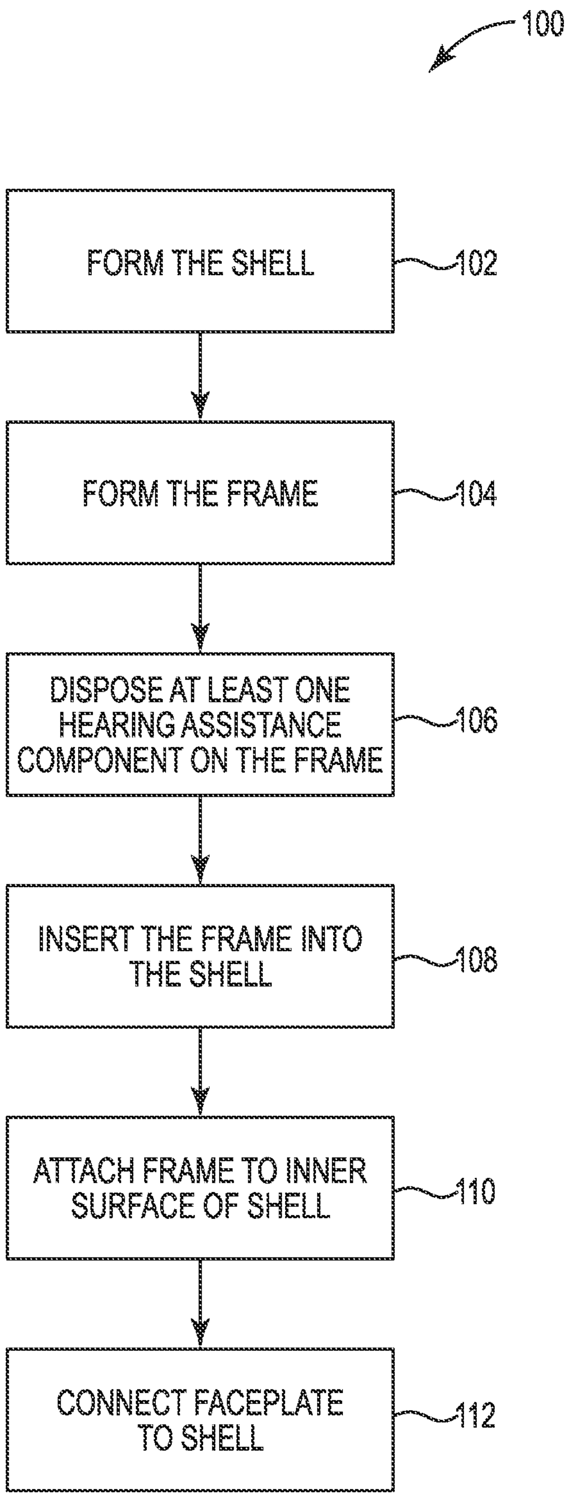
FIG. 7 is a flowchart of one embodiment of a method of forming the hearing assistance device of FIG. 1.

As mentioned herein, the hearing assistance device 10 can be manufactured using any suitable technique or techniques. For example, FIG. 7 is a flowchart of one embodiment of a method 100 of forming the hearing assistance device 10. Although described in the reference to hearing assistance device 10, the method 100 can be utilized to form any suitable hearing assistance device.

The method 100 includes forming the housing 12, which includes forming the shell 20 of the housing 20 at 102 and forming the frame 50 at 104 using any suitable technique or techniques. For example, a three-dimensional model of the ear cavity of the wearer can be formed. In one or more embodiments, the ear cavity can include any suitable portion of the ear canal, e.g., the entire ear canal. Any suitable technique or techniques can be utilized to form the three-dimensional model of the ear cavity of the patient. In one or more embodiments, a mold of the ear cavity can be taken using any suitable technique or techniques. Such mold can then be scanned using any suitable technique or techniques to provide a digital representation of the mold. In one or more embodiments, the ear cavity of the patient can be scanned using any suitable technique or combination of techniques to provide a three-dimensional digital representation of the ear cavity without the need for a physical mold of the ear cavity.

A three-dimensional model of the shell 20 based upon the three-dimensional model of the ear cavity of the wearer can be formed. Any suitable technique or combination of techniques can be utilized to form the three-dimensional model of the shell 20.

A three-dimensional model of the frame 50 can be formed based upon the three-dimensional model of the shell 20 using any suitable technique or techniques. In one or more embodiments, the three-dimensional model of the frame 50 can be added to the three-dimensional model of the shell 20 such that that the shell model and the frame model 50 are integral.

The shell 20 and the frame 50 can be formed from the three-dimensional models using any suitable technique or techniques, e.g., the techniques described herein. In one or more embodiments, the shell 20 and the frame 50 can be printed utilizing 3D printing.

The shell 20 and the frame 50 can be 3D printed using any suitable material or materials. In one or more embodiments, the same material or materials are utilized to print the shell 20 and the frame 50. In one or more embodiments, the shell 20 can include one or more materials that are different from the one or more materials included in the frame 50.

Further, in one or more embodiments, one or both of the shell 20 and the frame 50 can be formed by 3D printing utilizing a thin-walled cast process. In one or more embodiments, a secondary process can inject a high-strength silicone material into a cast that is formed by 3D printing from the 3D model. The silicone material can then be cured under pressure, and the cast can be cracked and removed.

In general, the shell 20 can be 3D printed with a first material, and the frame 50 can be 3D printed separately with a second material. In one or more embodiments, the first material is the same as the second material. In one or more embodiments, the first material is different from the second material.

The first and second materials can have any desired characteristics, e.g., hardness, opacity, ductility, etc. For example, in one or more embodiments, an indentation hardness value of the first material is equal to, greater than, or less than an indentation hardness value of the second material.

At least one component of the hearing assistance components 60 can be disposed on the frame 50 at 106 using any suitable technique. The frame 50 can be inserted at least partially within the shell 20 at 108 such that the void 42 is defined between the inner surface 26 of the shell and the at least a portion 56 of the frame. In one or more embodiments, the frame 50 can be attached to the inner surface 26 of the shell 50 at 110 using any suitable technique or techniques. In one or more embodiments, the faceplate 80 can be connected to the shell 50 at 112 using any suitable technique or techniques. In one or more embodiments, the frame 50 can be connected to the faceplate 80 such that the frame is inserted into the shell and the faceplate is connected to the second end 24 of the shell 20. In one or more embodiments, the frame 50 can be inserted into the shell 20 in a slot formed in the inner surface 26 of the shell as is further described herein.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A hearing assistance device, comprising:

a housing comprising a shell, a frame disposed at least partially within the shell, and a void defined between an inner surface of the shell and at least a portion of the frame, wherein an indentation hardness value of the frame is greater than an indentation hardness value of the shell, and further wherein the frame comprises a flex circuit that comprises traces and leads for one or more of the hearing assistance components disposed on the frame; and hearing assistance components disposed at least partially within the void, wherein a first component of the hearing assistance components is disposed on the frame.

2. The device of claim 1, wherein a second component of the hearing assistance components is disposed on the inner surface of the shell.

3. The device of claim 1, wherein the frame is attached to the inner surface of the shell.

4. The device of claim 1, wherein a first region of the inner surface of the shell is spaced apart from the frame and a second region of the inner surface of the shell is in contact with the frame.

5. The device of claim 4, wherein the first region of the inner surface of the shell is adapted to collapse into the void when the hearing assistance device is inserted into an ear canal of a wearer.

6. The device of claim 1, wherein the shell extends between a first end of the shell and a second end of the shell, wherein an outlet port is disposed at the first end of the shell.

7. The device of claim 6, further comprising a faceplate connected to the frame, wherein the faceplate is disposed at the second end of the shell.

8. The device of claim 6, wherein the shell has a length along a longitudinal axis that extends between the first and second ends, wherein the frame has a length along the longitudinal axis that is less than the length of the shell.

9. The device of claim 1, wherein the shell comprises silicone.

10. The device of claim 1, wherein the indentation hardness value of the shell is at least about 20 Shore A and no greater than about 70 Shore A.

11. The device of claim 10, wherein the indentation hardness value of the frame is at least about 50 Shore D and no greater than about 60 Rockwell C.

12. The device of claim 1, wherein the shell comprises an average thickness of at least about 0.1 mm and no greater than about 10 mm.

13. A hearing assistance device, comprising:

a housing comprising a shell and a 3D printed frame disposed at least partially within the shell, wherein an inner surface of the shell and at least a portion of the frame define a void, and further wherein an indentation hardness value of the frame is greater than an indentation hardness value of the shell; and hearing assistance components disposed at least partially within the void.

14. The device of claim 13, wherein the shell comprises a 3D printed shell.

15. The device of claim 14, wherein the 3D printed shell and the 3D printed frame are integral.

16. The device of claim 14, wherein the 3D printed shell comprises a first material and the 3D printed frame comprises a second material that is different from the first material.

17. The device of claim 13, wherein the 3D printed frame is a unitary 3D printed frame.

18. The device of claim 13, wherein a first component of the hearing assistance components is disposed on the 3D printed frame.

19. A hearing assistance device, comprising:

a housing comprising a shell, a frame disposed at least partially within the shell, and a void defined between an inner surface of the shell and at least a portion of the frame, wherein an indentation hardness value of the frame is greater than an indentation hardness value of the shell; and hearing assistance components disposed at least partially within the void;

wherein the indentation hardness value of the shell is at least about 20 Shore A and no greater than about 70 Shore A, and further wherein the indentation hardness value of the frame is at least about 50 Shore D and no greater than about 60 Rockwell C.

20. The hearing assistance device of claim 19, wherein the shell extends between a first end of the shell and a second end of the shell, and further wherein an outlet port is disposed at the first end of the shell;

wherein the hearing assistance device further comprises a faceplate connected to the frame, wherein the faceplate is disposed at the second end of the shell.

* * * * *